United States Patent [19]

Osborne

[11] 4,224,096
[45] Sep. 23, 1980

[54] LASER SEALING OF THERMOPLASTIC MATERIAL

[75] Inventor: Richard F. Osborne, Mauldin, S.C.

[73] Assignee: W. R. Grace & Co., Duncan, S.C.

[21] Appl. No.: 670,328

[22] Filed: Mar. 25, 1976

Related U.S. Application Data

[62] Division of Ser. No. 641,858, Dec. 17, 1975, Pat. No. 3,989,778.

[51] Int. Cl.$^2$ ............... B29C 27/02; B29D 9/04
[52] U.S. Cl. ................... 156/380; 156/497; 219/121 L; 331/DIG. 1
[58] Field of Search ............... 156/272, 380, 497, 285; 219/121 LM, 121 L; 331/DIG. 1

[56] References Cited

U.S. PATENT DOCUMENTS

| | | | |
|---|---|---|---|
| 2,705,523 | 4/1955 | Hasselquist | 156/285 |
| 3,292,503 | 12/1966 | Grubman et al. | 156/497 |
| 3,324,570 | 6/1967 | Flaith et al. | 34/156 |
| 3,560,291 | 2/1971 | Foglia et al. | 156/272 X |
| 3,597,578 | 8/1971 | Sullivan et al. | 219/121 L |
| 3,835,912 | 9/1974 | Kristensen et al. | 219/121 LM |

Primary Examiner—Michael G. Wityshyn
Attorney, Agent, or Firm—John J. Toney; William D. Lee, Jr.; John B. Hardaway

[57] ABSTRACT

Thermoplastic materials, particularly material in sheet form, may be sealed or thermowelded together using the energy from a single laser beam source by splitting the beam and directing it by mirrors to desired seal areas on the opposed sides of the materials to be sealed. The beam may be split in proportion to the thickness of the respective materials. Heating the opposed sides of materials to be sealed avoids the problem of overheating or burning the side to which energy is applied.

4 Claims, 4 Drawing Figures

LASER SEALING OF THERMOPLASTIC MATERIAL

This is a division of application Ser. No. 641,858, filed Dec. 17, 1975 now U.S. Pat. No. 3,989,778 which issued on Nov. 2, 1976.

FIELD OF THE INVENTION

This invention relates to the sealing together of sheets of thermoplastic materials, particularly to the sealing of selected areas of thermoplastic materials by radiant energy means such as lasers.

BACKGROUND OF THE INVENTION

Many materials such as thermoplastic film, metal foil, and flattened thermoplastic tubing are manufactured in a sheet-like form and in order to form a useful product from the material it is necessary to seal the sheet-like material to itself or to a similar material. If the material is thermoweldable or heat fusible it may be sealed to itself or a similar material by the proper application of energy which raises the temperature of the material to its welding or fusing temperature. Thermoplastic sheets made from materials such as polyethylene, polypropylene, polyvinyl chloride, polyvinylidene chloride, etc. are readily heat sealable or heat weldable; and, in the prior art, sealing or welding has been accomplished by pressing two sheets of thermoplastic film together between heated seal bars, by mechanically pressing the sheet together and applying radio-frequency energy, and by applying heated and compressed air blown through opposed nozzles to seal the material together. In addition to radio frequency energy, other sources of radiant energy have been employed to seal together thermoplastic materials. One such energy source is the laser described in U.S. Pat. No. 3,560,291 which issued on Feb. 2, 1971 to A. J. Foglia et al. The Foglia et al patent shows the bonding of thermoplastic resin films using radiation from a laser source. In another prior art disclosure, the laser welding of plastic tubes is described in U.S. Pat. No. 3,769,117 which issued on Oct. 30, 1973 to William Edmond Bowen et al. An additional application of laser energy to processing thermoplastic materials is a method of forming a tear line in a multi-layer laminate as described in U.S. Pat. No. 3,790,744 which issued to William Edmond Bowen on Feb. 5, 1974. However, in all of these prior art methods employing laser energy to seal thermoplastic materials, the energy is applied from one side only of the thermoplastic material with the result that the laser energy is absorbed in the layer of film nearest the source of energy. In this situation, little, if any, energy reaches the other layers of film so that the other layers are not molten and flowable to fuse into a secure seal. Accordingly, it is one object of the present invention to provide a method and apparatus for depositing equal amounts of energy in layers of film to be welded together.

Another deficiency in the prior art use of laser energy to thermoweld plastic materials is that when sufficient energy is applied to the layer nearest the energy source in order to quickly make a seal, such a deposition of energy will cause the layer to burn. Accordingly, it is another object of the subject invention to provide a method and apparatus by which thermoplastic materials may be sealed together without burning one of the layers.

The accomplishment of the foregoing and other objects will be apparent to those skilled in the art from the following Summary of the Invention and Detailed Description of the Preferred Embodiments.

SUMMARY OF THE INVENTION

In one aspect, the subject invention is a method of sealing thermoplastic materials together by providing a laser beam having a wave length which is readily absorbed in thermoplastic material, placing the areas of the thermoplastic materials which are to be sealed together in intimate contact with each other, splitting the laser beam into two components, and directing each of the beam components to impinge on a respective outer surface of the material whose surface is opposed to the area to be sealed. The beam may be split into two components so that the energy in each component is proportional to the thickness of the material upon which the respective component impinges.

In another aspect, the present invention is an apparatus for sealing together thermoplastic sheets in which the apparatus comprises the combination of a laser energy source for emitting a laser beam, a beam splitter for dividing the beam into two components, means for holding a selected area of two sheets of thermoplastic material in intimate contact, and, reflective surfaces for directing the beam components to opposed sides of the area of intimate contact so that one beam component impinges upon the area from a direction opposite to the other whereby the beam energy deposited in said sheets in the vicinity of the area causes the materials of the sheets to flow and fuse together.

IN THE DRAWINGS

In the drawings which are appended hereto and made a part of this disclosure:

Figure 3:
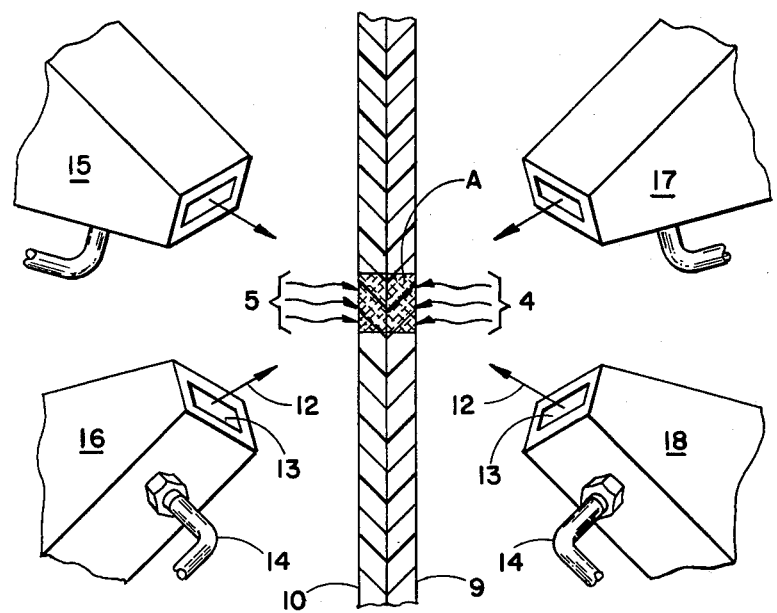
Figure 4:
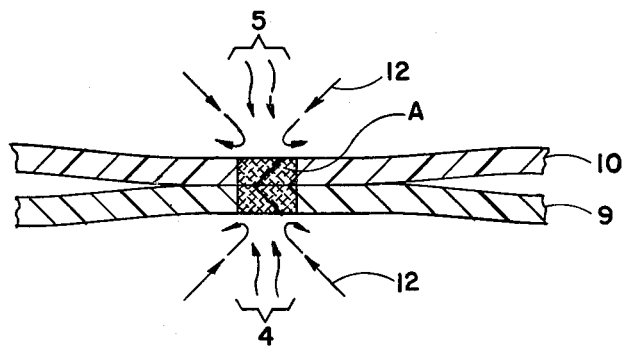

FIG. 3 is a schematic representation of a preferred means of clamping together the thermoplastic film sheets and shows a pair of gas jets with gas therefrom impinging on both sides of two vertical sheets of film which are being irradiated by the laser beam components in areas of the film which are held in intimate contact; and, FIG. 4 is a representation of the cross-section of the two segments of film clamped together for radiant energy welding by the two beam components according to the present invention.

DEFINITIONS

As used herein the terms lised below will be understood to have the meaning specified:

"Weld" means uniting by heating and allowing the materials to flow together where the materials are either plastic or metals.

"Welding temperature" means the temperature at which the particular material will flow and achieve a weld. When referring to thermoplastics, the welding and heat sealing temperatures will generally be used interchangeably.

"Radiant energy" is energy passed on or transmitted as electromagnetic radiation.

"Radiation" is energy emitted or propagated through space or a medium as waves or as particles. Common forms of radiation are light, X-rays, and gamma-rays.

"Laser" means light amplification by stimulated emission of radiation. The energy is electromagnetic radiation in the infra red regions of the spectrum and tends to be monochromatic with little beam divergence.

"Jet" means with a forceful stream of fluid or gas discharged from a narrow opening or nozzle and the spout or nozzle itself.

"Irradiation" means the application of radiant energy to a surface or article or the exposure of a surface to radiant energy or radiation.

"Beam splitter" means a partially reflecting mirror which will transmit a portion of a light beam and reflect the remaining portion.

PREFERRED EMBODIMENT

Figure 1:
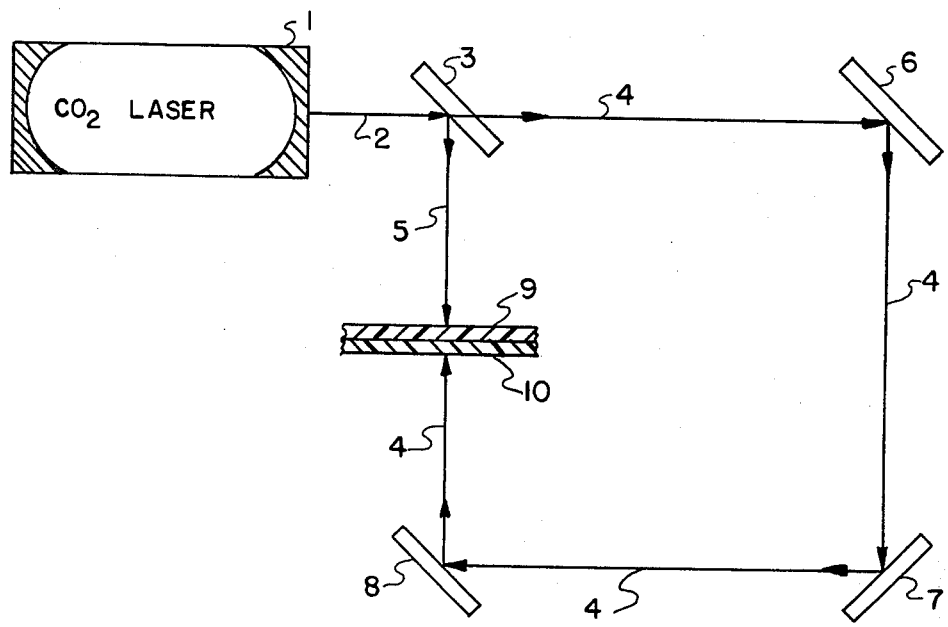
FIG. 1 is a schematic representation of a preferred embodiment of the present invention showing the laser source, beam splitter, and reflective surfaces for directing the beam to opposed sides of two thermoplastic sheets of film which are to be sealed together.

Referring to FIG. 1, the preferred apparatus and method of the present invention will be described. Laser beam 2 is generated by $CO_2$ laser energy source 1 and impinges upon beam splitter 3. The $CO_2$ gas laser is preferred for use in thermowelding plastic materials as the photons in the beam generated by the laser have wave lengths which are readily absorbed in thermoplastic materials such as the copolymer of vinyl chloride and polyvinyl chloride commonly known as "saran", in the ethylene vinyl acetate copolymer, and in polyethylene.

Figure 2:
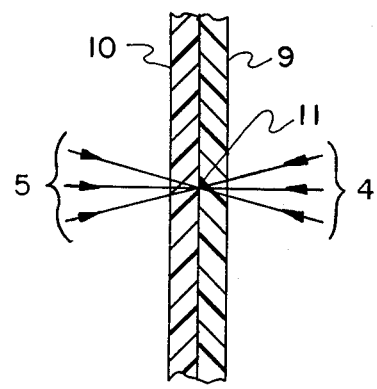
FIG. 2 is a cross section of two segments of the film sheets shown in FIG. 1 and representations of the laser beam components are shown impinging on the film areas which are to be thermowelded together.

Beam splitter 3 divides beam 2 into component 4 and component 5. Component 4 is reflected by totally reflecting surfaces or mirrors 6, 7, and 8 which are aligned at 45° angles with the beam 4 so that it will be reflected 90°. When beam 4 reaches thermoplastic film sheet segment 10 it is aligned coaxially with beam component 5 which is the portion of the beam 2 that was reflected by beam splitter 3. Beam components 4 and 5 impinge upon the respective film segments 9 and 10 as shown in greater detail in FIG. 2 where beam components 4 and 5 are shown directed upon focal point 11 which is the point of contact of the film segments 9 and 10 where a thermoweld or heat seal is desired. The energy which is deposited in the respective film segments 9 and 10 by the beam components 4 and 5 will heat the film rapidly to its flow or melt temperature so that the melt from each film segment will combine at 11 to fuse the segments together.

If desired, beam splitter 3 which may be a partially silvered mirror can be made so that it transmits either more or less than one-half of beam 2. Thus, if film segment 9 where thicker than film segment 10 it would be desirable that beam component 5 carry a greater proportion of the energy of beam 2 than does beam component 4.

Arrangements of the beam splitter and reflective surfaces other than the one shown in FIG. 1 are within the scope of the present invention. For example, instead of having the mirrors and beam splitter at the corners of a square, a rectangular configuration could be used. Also, the film segments or articles to be thermowelded together need not be placed between beam splitter 3 and mirror 8 but could as well be placed between mirrors 7 and 8, mirrors 6 and 7, etc. Furthermore, while a generally rectangular arrangement is preferred, a triangular arrangement can be used where mirror 7 is eliminated and the angle of mirror 6 and 8 are changed so that beam component 4 would be reflected directly across the diagonal from mirror 6 to mirror 8 in the square which appears in FIG. 1. In this case mirror 6 would be tilted so that it forms an included angle of 67.5° with beam component 4 so that the path of impinging beam 4 forms a 45° angle with the path of the reflected beam 4. The same angular arrangement would be made with mirror 8.

Turning now to FIGS. 3 and 4, a preferred means for holding or placing a selected area of each of the two sheets of thermoplastic material in intimate contact is shown. Sheets of thermoplastic material 9 and 10 are shown arranged vertically and the area A is the desired area of contact upon which laser beam components 4 and 5 impinge. Air jets 15 and 16 have slot jet orifices 13 from which compressed air 12 is directed against the area A in film segment 10 and jets 17 and 18 likewise have slot-jet orifices 13 from which compressed air is directed against area A in film component 9. The compressed air is supplied to the jets by supply line 14.

In FIG. 4 the same film segments 9 and 10 are shown in exaggerated detail to beam components 4 and 5 impinging upon area A and the compressive force of the air 12 from the jets is shown pressing the two film segments together. The arrangement of the compressed air jets to place the selected area of the film segments in intimate contact is also referred to herein as pneumatic clamping means. This clamping means has distinctive advantages over the prior art clamping means in that no mechanical means is needed to clamp the film and interfere with the passage of the laser beam. For further information regarding the pnematic clamping means reference is made to my copending application Ser. No. 605,361 which was filed on Aug. 18, 1975 entitled "Clamping of Film-Like Material for Radiant Energy Welding" and which is now U.S. Pat. No. 3,997,385 which issued on Dec. 14, 1976.

Having thus described my invention, I claim:

1. An apparatus for sealing together thermoplastic sheets comprising, in combination:
    (a) a laser energy source for emitting a laser beam;
    (b) a beam splitter for dividing said beam into two components;
    (c) pneumatic clamping means for holding a selected area of each of two sheets of thermoplastic material in intimate contact; and,
    (d) reflective surfaces for directing said beam components to opposed sides of said area of intimate contact so that one beam component impinges upon said area from a direction opposite to the other whereby the beam energy deposited in said sheets in the vicinity of said area causes the materials of said sheets to flow and fuse together.

2. The apparatus of claim 1 including three reflective surfaces for directing one of said beam components to the opposed side of said area.

3. The apparatus of claim 1 wherein said laser energy source is a $CO_2$ laser.

4. The apparatus of claim 1 wherein said beam splitter divides said beam into two equal components.

* * * * *